(12) United States Patent
Forciniti et al.

(10) Patent No.: US 9,890,270 B2
(45) Date of Patent: Feb. 13, 2018

(54) PHASED RUBBER COMPOSITION AND TIRE WITH TREAD

(71) Applicant: The Goodyear Tire & Rubber Company, Akron, OH (US)

(72) Inventors: Leandro Forciniti, Canton, OH (US); Roberto Cerrato Meza, North Canton, OH (US); Junling Zhao, Hudson, OH (US); Warren James Busch, North Canton, OH (US); Paul Harry Sandstrom, Cuyahoga Falls, OH (US); Gregory Daniel Zartman, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 44 days.

(21) Appl. No.: 15/257,056

(22) Filed: Sep. 6, 2016

(65) Prior Publication Data

US 2017/0101525 A1 Apr. 13, 2017

Related U.S. Application Data (60) Provisional application No. 62/238,737, filed on Oct. 8, 2015.

(51) Int. Cl.
*C08J 3/22* (2006.01)
*C08L 9/00* (2006.01)

(52) U.S. Cl.
CPC . *C08L 9/00* (2013.01); *C08J 3/22* (2013.01); *C08J 2309/00* (2013.01); *C08J 2407/00* (2013.01)

(58) Field of Classification Search
CPC .... C08J 3/22; C08J 3/226; C08K 3/04; C08K 3/36; C08L 9/00
USPC .......................................................... 523/351
See application file for complete search history.

(56) References Cited

U.S. PATENT DOCUMENTS

| 5,567,784 A | 10/1996 | Wider et al. ................. 526/164 |
| 5,696,197 A | 12/1997 | Smith et al. ................. 524/495 |
| 5,773,504 A | 6/1998 | Smith et al. ................. 524/492 |
| 9,260,594 B2 | 2/2016 | Fuchs et al. ................. 524/492 |
| 2016/0319112 A1 | 11/2016 | Vallat et al. |

FOREIGN PATENT DOCUMENTS

| DE | 10024613 A1 | 11/2000 |
| EP | 0763558 A1 | 3/1997 |
| EP | 0814113 A2 | 12/1997 |

OTHER PUBLICATIONS

EPO Search Report received by Applicant on Mar. 3, 2017.

*Primary Examiner* — Edward J Cain
(74) *Attorney, Agent, or Firm* — Henry C. Young, Jr.

(57) ABSTRACT

The invention relates to a phased rubber composition and tire tread thereof intended for heavy duty service such as for example a truck tire. The phased rubber composition is comprised of the product of blending a first rubber phase comprised of cis 1,4-polybutadiene rubber and reinforcing filler comprised of rubber reinforcing carbon black and a second rubber phase comprised of natural cis 1,4-polyisoprene rubber and reinforcing filler comprised of precipitated silica.

20 Claims, 1 Drawing Sheet

Balanced Batch Mixing

US 9,890,270 B2

PHASED RUBBER COMPOSITION AND TIRE WITH TREAD

FIELD OF THE INVENTION

The invention relates to a phased rubber composition and tire tread thereof intended for heavy duty service such as for example a truck tire. The phased rubber composition is comprised of the method and product of blending a first rubber phase in a form of a masterbatch comprised of cis 1,4-polybutadiene rubber and reinforcing filler comprised of rubber reinforcing carbon black together with zinc oxide and fatty acid and a second rubber phase comprised of natural cis 1,4-polyisoprene rubber and reinforcing filler comprised of precipitated silica.

BACKGROUND OF THE INVENTION

Tires may be prepared with treads comprised of diene-based rubber compositions which contain reinforcing filler as a combination of rubber reinforcing carbon black and precipitated silica. The precipitated silica may be used together with a silica coupler compound to couple the precipitated silica to diene-based elastomers contained in the rubber composition.

For intended heavy duty service, particularly for a truck tire, it is sometimes desired to promote heavy duty performance physical properties for its tread such as, for example, a combination of abrasion resistance and crack growth resistance properties while providing a suitable stiffness property.

An increase in such physical properties of a rubber composition may often be expected to increase its hysteresis property which, in turn, may be expected to promote an undesirable increase in internal heat generation for the tire tread during the tire's heavy duty service. An increase in such hysteresis property may be indicated, for example, by a decrease in the rubber composition's rebound property, particularly its hot (e.g. 100° C.) rebound property, and/or an increase in its tangent delta (tan delta) property.

Here, a challenge is presented to promote such combination of physical properties with a minimal increase, if any, of a hysteresis property of the tread rubber composition and thereby desirably substantially maintaining its hysteresis.

It is further desired to promote such physical properties for the tread rubber composition without significantly increasing, and desirably substantially maintaining, its uncured processing viscosity to thereby promote satisfactory processing (e.g. mixing, extrusion and calendering) of the rubber composition.

For such challenges it is desired to evaluate providing the tread rubber as a composite of a blend of rubber phases individually comprised of combinations of diene-based elastomer(s) and reinforcing fillers selected from rubber reinforcing carbon black and precipitated silica.

It is proposed for the overall tread rubber to contain diene-based elastomers comprised of cis 1,4-polybutadiene and natural rubber (natural cis 1,4-polyisoprene) with reinforcing filler comprised of a combination of rubber reinforcing carbon black and precipitated silica with silica coupling agent for the precipitated silica.

It is further proposed to provide the tread rubber composition as a composite of a blend of a first phase comprised of cis 1,4-polybutadiene rubber and reinforcing filler comprised of rubber reinforcing carbon black and a second phase comprised of natural rubber (natural cis 1,4-polyisoprene) and reinforcing filler comprised of precipitated silica.

For such phased rubber blend, it is proposed to provide a first phase comprised of a masterbatch of cis 1,4-polybutadiene rubber and reinforcing filler comprised of rubber reinforcing carbon black together with metal oxide comprised of zinc oxide and added fatty acid and to provide a second phase comprised of a masterbatch of natural rubber and reinforcing filler comprised of precipitated silica without the zinc oxide and added fatty acid.

The zinc oxide is to be selectively provided in the first phase (the polybutadiene rubber with carbon black reinforcing filler) to avoid pre-mature reaction of the zinc oxide with the precipitated silica and silica coupler and to thereby promote a more delayed interaction of the zinc oxide with the precipitated silica and with the silica coupler to thereby render a more efficient reaction of the precipitated silica and coupler in the second phase (comprised of the cis 1,4-polyisoprene rubber and precipitated silica with silica coupler in the absence of the zinc oxide).

The fatty acid (e.g. carboxylic acid such as, for example, at least one of stearic, palmitic and oleic acid) is to be selectively added in the first phase (polybutadiene rubber with carbon black reinforcement) to promote better processing of the polybutadiene rubber followed by promoting better processing of the combination of the rubber phases, taking into consideration that it is envisioned that the natural rubber naturally contains a small amount (e.g. from about 0.5 to about 1.2 phr) of fatty acid.

The zinc oxide and fatty acid are added together in the first phase (polybutadiene rubber with carbon black reinforcement) to promote formation of fatty acid salt (e.g. zinc stearate) within the polybutadiene rubber of the first phase to thereby promote activation of subsequently added sulfur cure accelerators (sulfur cure accelerators added to the subsequently blended first and second rubber phases) predominately in the presence of the polybutadiene rubber.

The two rubber phases (masterbatches) are to be mixed together followed by mixing with sulfur curatives or mixed together with sulfur curatives.

A silica coupling agent may be mixed together with the precipitated silica in the second masterbatch or added after the two masterbatches are mixed together, although it is usually desired to blend the silica coupler with the precipitated silica containing second masterbatch.

In practice, it is recognized that a reinforcing filler (e.g. the rubber reinforcing carbon black and precipitated silica) has a preferential reinforcing affinity for the first diene-based elastomer with which it is mixed (e.g. the carbon black for the cis 1,4-polybutadiene rubber in the first phase or the precipitated silica with the natural rubber in the second phase, particularly when combined with the coupling agent in the second phase). It is believed that such preferential reinforcing filler reinforcement phenomenon is understood by those having skill in such art.

For this evaluation, it is therefore desired to individually and separately promote such preferential reinforcing affinities of the reinforcing fillers with the respective elastomers by the preparation of the two rubber phases (two masterbatches) followed by blending the phases together.

In this manner, in the blended elastomer composition, it is envisioned that the carbon black maintains a greater preferential reinforcing affinity for the cis 1,4-polybutadiene rubber of the first rubber phase and the precipitated silica maintains a greater preferential reinforcing affinity for the natural rubber of the second rubber phase, all within the blended elastomer composition (blended masterbatches).

As a result, it is envisioned that carbon black presents a comparatively less reinforcing effect for the natural rubber of the second phase and the precipitated silica has a comparatively less reinforcing effect for the cis 1,4-polybutadiene rubber of the first phase.

As a result, for the blend of the rubber phases (masterbatches), it is further envisioned that only a limited migration of the carbon black into the natural rubber of the second phase may occur and only a limited migration of the precipitated silica into the cis 1,4-polybutadiene rubber of the first phase may occur.

Therefore, it is envisioned that the resultant rubber composition is largely composed of two phases, namely a carbon black reinforced cis 1,4-polybutadiene rubber phase and a precipitated silica reinforced natural rubber phase.

In this manner a combination of predominantly carbon black reinforced cis 1,4-polybutadiene rubber properties may be promoted and predominantly precipitated silica reinforced natural rubber properties may be promoted for the resultant tread rubber composition.

In one embodiment, it is envisioned that a dominating rubber phase (e.g. a continuous phase) is the first phase comprised of cis 1,4-polybutadiene rubber containing the rubber reinforcing carbon black in the instance where the first phase is of a larger concentration in the rubber composition than the second phase (e.g. a dispersed phase within the continuous phase), comprised of a natural rubber-containing the precipitated silica.

As indicated, the individual first and second rubber phases may, for convenience, also be respectively referred to as first and second rubber masterbatches.

The rubber composition comprised of the blend of the individual rubber phases, or masterbatches, may then be shaped to form a tire tread and sulfur cured, together with assembled tire components, to form the tire.

It is important to appreciate that such preparation of the dual phased rubber composition for this evaluation is intended to be a significant departure from a more simple step-wise sequential mixing of precipitated silica and rubber reinforcing carbon black reinforcing fillers in a rubber composition and from a more simple dual masterbatch mixing of elastomers and reinforced fillers.

The term "phr" where used herein, and according to conventional practice, refers to "parts of a respective material per 100 parts by weight of rubber, or elastomer". The terms "rubber" and "elastomer" where used herein, are to be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "vulcanize" and "cure" where used therein are used interchangeably unless otherwise indicated.

SUMMARY AND PRACTICE OF THE INVENTION

In accordance with this invention, a method is provided for preparation of a sulfur curable rubber composition comprised of diene-based elastomers with reinforcing filler comprised of a combination of rubber reinforcing carbon black and precipitated silica comprised of:

(A) preparation of a first masterbatch comprised of cis 1,4-polybutadiene rubber and reinforcing filler comprised of rubber reinforcing carbon black, (B) preparation of a second masterbatch comprised of natural cis 1,4-polyisooprene rubber and reinforcing filler comprised of precipitated silica, and (C) blending said masterbatches:
  (1) together followed by addition of sulfur curatives comprised of sulfur and sulfur vulcanization accelerator(s), or
  (2) together with sulfur curatives comprised of sulfur and sulfur vulcanization accelerator(s),
  wherein a silica coupling agent (silica coupler) is blended with:
    (a) with the second masterbatch, or
    (b) with the blend of masterbatches to couple the precipitated silica to the diene-based elastomer(s), where the silica coupling agent contains a moiety reactive with hydroxyl groups on said precipitated silica and another different moiety interactive with said diene-based elastomer(s).

In practice, it is understood that, if desired and appropriate, a minor amount of precipitated silica may be added to at least one of said first masterbatch or to the blend of first and second masterbatches (e.g. up to about 8 phr of precipitated silica).

In practice, it is understood that, if desired and appropriate, a minor amount of rubber reinforcing carbon black may be added to at least one of said second masterbatch or to the blend of first and second masterbatches (e.g. up to about 8 phr of the carbon black which may be provided, for example, as a carrier for the silica coupler).

In practice, it is understood that, if desired and appropriate, a minor amount of additional diene-based rubber (exclusive of isobutylene-based rubber) may be added to at least one of said first masterbatch or to the blend of first and second masterbatches (e.g. up to about 10 phr thereof). Representative of such additional diene-based rubbers are, for example, cis 1,4-polyisoprene and styrene/butadiene rubbers.

In practice, it is understood that, if desired and appropriate, a minor amount of additional diene-based rubber may be added to at least one of said second masterbatch or to the blend of first and second masterbatches (e.g. up to about 10 phr thereof). Representative of such additional diene-based rubbers are, for example, cis 1,4-polybutadiene and styrene/butadiene rubbers.

In practice, it is understood that that one or more of various rubber compounding ingredients including, for example, zinc oxide, fatty acid (e.g. at least one of stearic, palmitic and oleic acids), resins and processing aids may be added to any of the masterbatches or to their blend as may be appropriate and desired.

A rubber composition is provided as being prepared by said method. Said method further comprises shaping and sulfur curing the blend of masterbatches to form a sulfur cured rubber composition or shaped and cured composite (e.g. tread) of a tire.

A sulfur cured rubber composition is thereby provided by said method.

In further accordance with this invention a tire is provided having a component (e.g. a tire tread) comprised of the shaped and sulfur cured composite of this invention.

In one embodiment, the rubber reinforcing carbon black is characterized by having an iodine value (ASTM D1510) in a range of from about 70 to about 190 together with a dibutylphthalate (DBP) value (ASTM D2414) in a range of from about 80 to about 140.

Representative of such rubber reinforcing carbon blacks are, for example N121, N120 and N220, which are ASTM designations.

In one embodiment, said silica coupling agent is comprised of at least one of alkoxyorganomercaptosilane and bis(3-triethoxysilypropyl) polysulfide containing an average of from 2 to about 4, alternately from about 2 to 2.6 or from 3.5 to 4, connecting sulfur atoms in its polysulfidic bridge.

In one embodiment, each of said first and second masterbatches is individually mixed (non-productive mixing) to a temperature in a range of from about 140° C. to about 170° C.

In one embodiment, said first and second masterbatches are mixed together or their blend is mixed together with sulfur curatives (productive mixing with sulfur and at least one sulfur vulcanization accelerator) to a temperature in a range of from about 100° C. to about 130° C.

A significant aspect of this invention is providing a tread rubber composition with the phase mixed rubber composition (instead of a more conventionally mixed rubber composition) resulting in enhanced (improved) wear resistance as illustrated by reduced rate of abrasion of the rubber composition and thereby predictive reduction in tread wear as well as enhanced (improved) resistance in cut growth propagation and thereby a predictive beneficial increase in tread durability while substantially and beneficially maintaining hysteresis (as evidenced by hot rebound property) to predictively beneficially substantially maintain resistance to internal heat generation (and thereby resistance to temperature build-up) within the tread rubber during tire service.

In this manner, a benefit is gained by achievement of physical properties for a rubber composition resulting from a combination of individual physical properties of the first and second masterbatches prepared separately followed by being blended together.

In further accordance with this invention, a rubber composition is provided which is comprised of said composites of blended masterbatches.

In one aspect of the invention, a rubber composition is provided as being prepared by the method of this invention.

A further significant aspect of the invention is providing the rubber composition comprised of the prepared blend of a dominate (major continuous portion) cis 1,4-polybutadiene rubber phase containing said rubber reinforcing carbon black (together with the zinc oxide and added fatty acid) and a dispersed (minor portion) cis 1,4-polyisoprene natural rubber phase containing said precipitated silica, wherein cis 1,4-polybutadiene rubber phase contains from about 35 to about 70 phr of rubber reinforcing carbon black to thereby provide a path of least electrical resistance (least electrical resistivity) through said rubber composition.

In such manner, then, a tire is provided with tread comprised of such phased rubber blend which contains a path of least electrical resistance (last electrical resistivity) through the dominate polybutadiene rubber phase to the tread running surface to thereby promote dissipation of internally generated electrical charge from the tire tread to the ground.

In additional accordance with this invention, a tire is provided having at least one component comprised of such rubber composition, particularly a sulfur cured rubber composition.

In additional accordance with this invention, such tire component is a tire tread.

For the cis 1,4-polybutadiene rubber, it is envisioned that the cis 1,4-polybutadiene rubber may be a neodymium catalyst prepared polybutadiene by, for example, polymerization of 1,3-polybutadiene monomer in an organic solvent solution in the presence of a catalyst comprised of neodymium compound (which may be used together with, for example, an aluminum alkyl and an aluminum chloride delivering compound) and where the polybutadiene polymer might be coupled, for example, by treating the reaction mixture with, for example, a sulfur chloride such as, for example, disulfur dichloride as mentioned in U.S. Pat. No. 5,567,784.

Representative of such cis 1,4-polybutadiene rubber is, for example, a specialized cis 1,4-polybutadiene having a microstructure comprised of about 96 to about 99 percent cis 1,4-isomeric units, a number average molecular weight (Mn) in a range of from about 150,000 to about 200,000 and a heterogeneity index (Mw/Mn) in a range of from about 1.5/1 to about 2/1.

Representative of neodymium compounds for such catalysis of cis 1,3-butadiene monomer might be, for example, neodymium neodecanoate, neodymium octanoate or neodymium versalate. The neodymium compounds might be derived from a neodymium carboxylate soap such as, for example $Nd(R-C00)_3$. Representative of aluminum alkyl compounds may be, for example, triisobutylaluminum (TIBA) and diisobutylaluminum hydride (DIBAH). Representative of aluminum chloride delivering compounds may be, for example, diethylaluminum chloride, all so long as the specialized polybutadiene elastomer possesses the aforesaid microstructure, molecular weight and heterogeneity index and Tg ranges.

Therefore, the catalyst for preparation of said specialized polybutadiene elastomer is exclusive of titanium, cobalt or nickel based catalysts used for preparation of cis 1,4-polybutadiene elastomers.

For this evaluation, a purpose of inclusion of the specialized polybutadiene with its relatively high number average molecular weight, relative low homogeneity index and somewhat low Tg is to promote higher rebound values for the rubber composition which is predictive of less internal heat generation, and therefore less temperature build-up, for the rubber composition when it is being worked and predictive of better (lower) rolling resistance for a tire with a tread of such rubber composition which contains the specialized polybutadiene rubber. A further purpose is to promote greater abrasion resistance of the rubber composition which is predictive of better resistance to tread wear for a tire with such rubber composition which contains the specialized polybutadiene rubber.

Representative of said specialized cis 1,4-polybutadiene rubber for use in this invention is, for example, Budene 1224™ from The Goodyear Tire & Rubber Company and CB25™ from Lanxess. While the technical aspect may not be fully understood, it is a feature of this invention that the specialized cis 1,4-polybutadiene rubber is differentiated from other cis 1,4-polybutadiene rubbers as being required to be the product of organic solvent solution polymerization of 1,3-butadiene monomer in the presence of a neodymium based catalyst instead of lithium, cobalt or nickel based polymerization catalysts.

The specialized cis 1,4-polybutadiene elastomer is believed to have a have a degree of branched configuration which is understood to promote processability in its unvulcanized state.

A drawing is provided to further describe the invention.

BRIEF DESCRIPTION OF DRAWING

A drawing is provided to illustrate a process of preparing a rubber composition by preparing and blending separate masterbatches of rubber compositions, namely a first masterbatch comprised of polybutadiene rubber with carbon black reinforcing filler and a second masterbatch with precipitated silica reinforcement.

THE DRAWING

Figure 1:
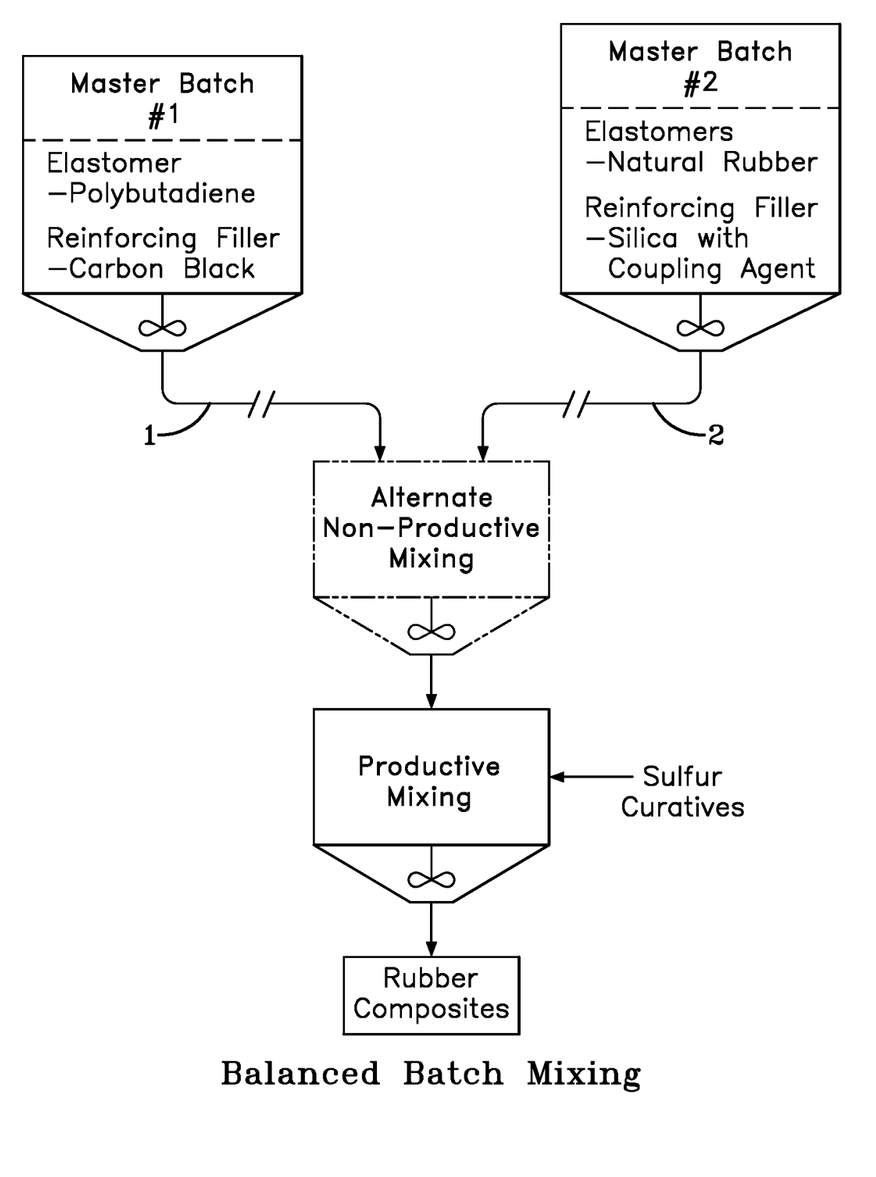

In the drawing depicting balanced batch mixing (balanced batch mixing), a first masterbatch (Master Batch No. 1 or MB-1) is provided by non-productive mixing (non-productive mixing) of a blend of cis 1,4-polybutadiene elastomer (rubber) containing a dispersion of reinforcing filler as rubber reinforcing carbon black. In the drawing, a second masterbatch (Master Batch No. 2 or MB-2) is provided by non-productive mixing (non-productive mixing) of a blend of natural rubber (cis 1,4-polyisprene elastomer) containing a dispersion of reinforcing filler as precipitated silica together with silica coupling agent where the silica coupling agent is allowed to react with the precipitated silica in the second masterbatch.

Alternatively (not shown) the coupling agent may be added to a blend of the first and second masterbatches instead of, or in combination with, being added in the second masterbatch.

In the drawing, the masterbatches are blended together in a productive mixing step (Productive Mixing) with sulfur curatives being added (sulfur curatives) (e.g. sulfur and at least one sulfur cure accelerator) to form a rubber composite (rubber composites).

Rubber compounding ingredients may be added to the mixing procedure (not shown) such as, for example, and not intended to be limiting, zinc oxide and fatty acid.

Alternatively the masterbatches (Master Batch No. 1 and Master Batch No. 2) may be blended together in an intermediate alternate non-productive mixing step (alternate additional Non-productive Mixing) following which sulfur curatives are added in the productive mixing step (Productive Mixing).

The rubber composite (rubber composition) may be shaped and sulfur cured (not shown in the Drawing) to form a sulfur cured rubber composition or shaped and cured composite (e.g. tread) of a tire.

The curatives for sulfur curing the rubber composition are curatives conventionally used for sulfur curable elastomers which typically include an addition of free sulfur and one or more appropriate cure accelerators which may also sometimes include a cure retarder. Such curatives and use thereof for sulfur curable elastomer compositions are well known to those skilled in the art.

It is to be appreciated that the coupling agent, which may be in a liquid form, might be used in conjunction with a carbon black carrier, namely, pre-mixed with a carbon black, particularly a rubber reinforcing carbon black, prior to the addition to the rubber composition, and such rubber reinforcing carbon black can be included in the amount of rubber reinforcing carbon black accounted for in the rubber composition formulation.

It is therefore readily understood by those having skill in the art that the rubber composition would be compounded, as may be appropriate, by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials. Depending on the intended use of the sulfur vulcanizable and sulfur vulcanized material (rubbers), the additives mentioned above are selected and commonly used in conventional amounts.

In the preparation of the rubber composition typical amounts of tackifier resins, if used, may comprise, for example, about 0.5 to about 10 phr, usually about 1 to about 5 phr. Typical amounts of processing aids may comprise, for example, about 1 to about 50 phr.

Such processing aids can include, for example, aromatic, naphthenic, and/or paraffinic processing oils. Typical amounts of antioxidants may comprise about 1 to about 5 phr. Representative antioxidants may be, for example, diphenyl-p-phenylenediamine and others such as, for example, those disclosed in The Vanderbilt Rubber Handbook (1978), Pages 344 through 346. Typical amounts of antiozonants, if used, may comprise, for example, about 1 to about 5 phr.

Typical amounts of fatty acids, where used, which can include stearic acid, palmitic acid, linoleic acid or mixtures of one or more fatty acids, can comprise, for example from about 0.5 to about 5 phr.

Often stearic acid is used in a relatively impure state, in a sense of being a blend with additional fatty acids, such as for example palmitic and oleic and possibly linoleic acids, and might sometimes be more commonly referred to in the rubber compounding practice as "stearic acid" when referred to in the description and practice of this invention. Typical amounts of zinc oxide may comprise, for example, about 1 to about 5 phr.

Typical amounts of waxes, usually microcrystalline waxes, if used, may comprise, for example, about 1 to about 5 phr. Typical amounts of peptizers, if used, may comprise, for example, from about 0.1 to about 1 phr. Typical peptizers may be comprised of, for example, pentachlorothiophenol and dibenzamidodiphenyl disulfide.

As indicated, the vulcanization is conducted in the presence of a sulfur vulcanizing agent. Examples of suitable sulfur vulcanizing agents include the elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used, for example, in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e. primary accelerator. Conventionally and preferably, a primary accelerator(s) is used, for example, in total amounts ranging from about 0.5 to about 4, preferably about 0.8 to about 2, phr. In another embodiment, combinations of a primary and a secondary accelerator might be used with the secondary accelerator being used in amounts of, for example, about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used, if desired and appropriate. Various accelerators that may be used are, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is generally a guanidine, dithiocarbamate or thiuram compound.

The presence and relative amounts of the above ingredients, other than aforesaid precipitated silicas and associated coupling agents, are not considered to be a primary subject of this invention.

The following examples are provided to further illustrate the invention. The parts and percentages are by weight unless otherwise indicated.

Example I

Sequential Mixing of Elastomers and Reinforcing Fillers

Rubber compositions were prepared with dispersed reinforcing filler comprised of a combination of rubber reinforcing carbon black and precipitated silica.

Control rubber Sample A is a control rubber sample containing a combination of rubber reinforcing carbon black and precipitated silica, together with silica coupling agent, simply blended with and dispersed in a combination of cis 1,4-polybutadiene, cis 1,4-polyisoprene and styrene/butadiene elastomers.

Experimental rubber Sample B is a rubber sample comprised of cis 1,4-polyutadiene rubber and natural cis 1,4-polyisoprene rubber to which rubber reinforcing carbon black and precipitated silica where added together with a silica coupling agent.

The general formulation for the rubber Samples A and B are illustrated in the following Table 1 where parts and percentages are by weight unless otherwise indicated.

TABLE 1

| Material | Parts by Weight (phr) |
| --- | --- |
| Cis 1,4-polybutadiene rubber A[1] | 0 and 65 |
| Cis 1,4-polybutadiene rubber B[2] | 0 and 25 |
| Solution polymerization prepared styrene/butadiene rubber[3] | 0 and 25 |
| Natural (cis 1,4-polisoprene) rubber | 35 and 50 |
| Rubber reinforcing carbon black (N220 or N121)[4] | 36 and 55 |
| Precipitated silica[5] | 0 and 16 |
| Silica coupling agent[6] | 1.3 |
| Fatty acid[7] | 2 and 2.5 |
| Zinc oxide | 3 |
| Rubber processing oil | 0 and 5 |
| Sulfur | 1 and 1.1 |
| Sulfur cure accelerators[8] | 1.5 and 3 |

[1]Cis 1,4-polybutadiene rubber prepared by solution polymerization with neodymium based catalysis, having a Tg of about −106° C. as Budene 1224 ™ from The Goodyear Tire & Rubber Company
[2]Cis 1,4-polybutadiene rubber prepared by solution polymerization with nickel based catalysis, having a Tg of about −106° C. as BR5510 ™ from Sabic
[3]Solution polymerization prepared styrene/butadiene as SLF18B10 ™ from The Goodyear Tire & Rubber Company having a styrene content of about 18.5 percent and a Tg of about −78° C.
[4]N220 and N121 as ASTM designation for the rubber reinforcing carbon black
[5]Precipitated silica as HDP320 ™ from PPG
[6]Silica coupler as HP-1529 ™ from CVX Chemical Spec, Ltd, a bis(3- triethoxysilylpropyl) polysulfide with an average of from about 2 to about 2.6 connecting sulfur atoms in its polysulfidic bridge, without a carbon black carrier
[7]Fatty acid comprised primarily of stearic, palmitic and oleic acids
[8]Sulfur cure accelerators as a sulfenamide and diphenylguanidine Rubber Samples A and B are illustrated in the following Table 2.

TABLE 2

| | Rubber Samples (phr) | |
| --- | --- | --- |
| Materials | A | B |
| Non-Productive Mixing (NP) | | |
| Cis 1,4-polybutadiene A | 0 | 65 |
| Cis 1,4-polybutadiene B | 25 | 0 |
| Natural rubber | 50 | 35 |
| Styrene/butadiene rubber | 25 | 0 |
| Rubber reinforcing carbon black (N220) | 55 | 0 |
| Rubber reinforcing carbon black (N121) | 0 | 35.5 |
| Precipitated silica | 0 | 16 |
| Silica coupling agent | 0 | 1.3 |
| Fatty acid | 2.5 | 2 |
| Rubber processing oil | 5 | 0 |
| Productive Mixing (P) | | |
| Sulfur | 1 | 1.1 |
| Sulfur cure accelerators | 3 | 1.5 |

Various cured and uncured rubber properties of rubber Samples A and B are reported in the following Table 3.

TABLE 3

| | Rubber Samples | | |
| --- | --- | --- | --- |
| Properties | A | B | |
| Uncured Rubber Processing | | | |
| Uncured storage modulus, G' (KPa) at 15% strain, 100° C. and 0.83 Hertz | 0.25 | 0.29 | Lower is better |
| Tire Tread Predictive Handling Properties, Cured Storage Modulus (G')[1] at 100° C., 11 Hertz (KPa) | | | |
| 10 percent strain | 1.4 | 1.5 | Higher is better |
| 50 percent strain | 1.1 | 1 | Higher is better |
| Tire Tread Rolling Resistance (Hysteresis) Predictive Properties | | | |
| Rebound (100° C.) | 53 | 63 | Higher is better |
| Tan delta, (100° C., 10% strain, 11 Hertz) | 0.15 | 0.12 | Lower is better |
| Tire Treadwear Predictive Property, Abrasion Resistance | | | |
| Grosch abrasion[2], high, mg/km (rate of abrasion) | 561 | 632 | Lower is better |
| Crack Growth (Crack Groove Flex Test)[1], 4 hr 95° C. (min/mm) | | | |
| Original | 13 | 10 | Higher is better |
| Aged (7 days at 70° C. in air) | 12 | 8 | Higher is better |

[1]Crack Groove Flex Test (DeMattia) as ASTM D813 or DIN 53522

From Table 3 it can be seen that increasing the cis 1,4-polybutadiene content in rubber Sample B together with also an addition of the coupled precipitated silica content resulted in a beneficial reduction in the rubber composition's hysteresis (an increase in its hot rebound value of from 53 to 63 and decrease in its tan delta properties of from 0.15 to 0.12).

However, from Table 3 it can also be seen that the durability of the rubber composition rubber Sample B is considered as being challenged in a sense that it promoted both an undesirable increase in its rate of abrasion of from 561 to 632 and an undesirable decrease in both original crack growth (from 13 to 10) and aged crack growth (from 12 to 8).

Therefore, it is concluded that desired decrease in rate of abrasion and increase in crack growth (time for the crack to grow, or propagate) for the rubber composition comprised of a combination of cis 1,4-polybutadiene rubber and natural rubber which contained reinforcing filler as a combination of rubber reinforcing carbon black and precipitated silica was not achieved by the indicated sequential mixing process of such elastomers and reinforcing fillers.

Example II

Masterbatch Mixing of Rubber Compositions

Two separate masterbatches of rubber compositions were prepared in which the polybutadiene rubber and polyisoprene rubber were mixed separately with the rubber reinforcing carbon black and precipitated silica.

A first masterbatch (MB-1) was prepared comprised of a blend of cis 1,4-polyutadiene rubber containing reinforcing filler dispersion as rubber reinforcing carbon black to promote abrasion resistance for the rubber composition.

A second masterbatch (MB-2) was prepared comprised of a blend of cis,4-polyisoprene rubber containing reinforcing filler dispersion as precipitated silica to promote a reduction in hysteresis property for the rubber composition.

The following Table 4 illustrates a general formulation for the first masterbatch (MB-1) and second masterbatch (MB-2) and for the blend of the masterbatches (which was the same overall formulation as for rubber Sample B of Example I) where parts are by weight (phr) unless otherwise indicated.

Table 4 further shows that the zinc oxide and fatty acid (carboxylic acid) were added to the first polybutadiene rubber/carbon black masterbatch, MB-1, instead of the second natural rubber/silica masterbatch, MB-2.

A purpose for addition of the zinc oxide with the first masterbatch (MB-1) instead of the second masterbatch (MB-2) is to evaluate preventing the zinc oxide from pre-maturely interfering with the precipitated silica/silica coupler interaction.

A purpose for addition of the fatty acid with the first masterbatch (MB-1) instead of the second masterbatch (MB-2) is to evaluate allowing the fatty acid to promote better processability of the MB-1 and of the combination of MB-1 plus MB-2 masterbatches.

A purpose of adding the zinc oxide and fatty acid are together in the first phase (MB-1), namely the polybutadiene rubber with carbon black reinforcement, is to promote formation of a fatty acid salt thereof within the polybutadiene rubber of the first phase to thereby promote activation of subsequently added sulfur cure accelerators (sulfur cure accelerators added to the subsequently blended first and second rubber phases) predominately in the presence of the polybutadiene rubber

TABLE 4

| Materials | MB-1 | MB-2 | MB-1 + MB-2 |
|---|---|---|---|
| Non-productive Mixing Step(s) | | | |
| Cis 1,4-polybutadiene rubber A | 65 | 0 | 65 |
| Natural rubber | 0 | 35 | 35 |
| Carbon black (N121) | 35 | 0 | 35 |
| Precipitated silica | 0 | 16 | 16 |
| Silica coupling agent (coupler) | 0 | 1.3 | 1.3 |
| Fatty acid | 2 | 0 | 2 |
| Zinc oxide | 2 | 0 | 2 |
| Productive Mixing Step - upon mixing the Masterbatches | | | |
| Sulfur | 0 | 0 | 1.1 |
| Sulfur cure accelerators(s) | 0 | 0 | 1.5 |

Various cured and uncured rubber properties of the blend of masterbatches (MB-1 plus MB-2) as well as the properties reported in Example I for the rubber Sample B, are reported in the following Table 5.

Electrical resistivity of the blend of masterbatches (MB-1 plus MB-2) and of rubber Sample B of Example 1 were determined.

TABLE 5

| Properties | MB-1 + MB-2 | Sample B of Example I | |
|---|---|---|---|
| Processing | | | |
| Uncured storage modulus G' at 15% strain, 100° C. and 0.83 Hertz (KPa) | 0.25 | 0.29 | Lower is better |
| Rubber Properties Tire Tread Predictive Handling Properties, Cured Storage Modulus (G')[1] at 100° C., 11 Hertz (KPa)[1] | | | |
| 10% strain (KPa) | 1.44 | 1.5 | Higher is better |
| 50% strain (KPa) | 1 | 1 | Higher is better |
| Tire Tread Rolling Resistance (Hysteresis) Predictive Properties | | | |
| Rebound (100° C.) | 63 | 63 | Higher is better |
| Tan delta (100° C., 10% strain, 11 Hertz) | 0.11 | 0.12 | Lower is better |
| Tire Treadwear Predictive Property, Abrasion Resistance | | | |
| Grosch abrasion, High, mg/km (rate of abrasion) | 472 | 632 | Lower is better |
| Crack Growth (Pierced Groove Flex Test)[1], 4 hr 95° C. (min/mm) | | | |
| Original | 15 | 10 | Higher is better |
| Aged (7 days at 70° C. in air) | 14 | 8 | Higher is better |
| Electrical conductivity | | | |
| Volume Resistivity (ohm · cm)[1] | 8. × 10$^3$ | 4.2 × 10$^5$ | |

[1]Volume Resistivity as ASTM D257

For electrical resistivity consideration, both the blend of masterbatches (MB-1 plus MB-2) and rubber Sample B of Example I contained 35 phr of rubber reinforcing carbon black. However, in this Example II, the blend of masterbatches was provided with the first dominate and therefore continuous, phase of polybutadiene rubber containing 54 phr of the rubber reinforcing carbon back with the second phase of polyisoprene rubber containing the silica reinforcement being dispersed therein.

It is seen from Table 5 that the electrical resistivity of the blend of masterbatches provided an electrical resistivity which was substantially less (8.5×10$^3$ ohm cm) than the electrical resistivity of the rubber Sample B of Example I (4.2×10$^5$ ohm cm).

It is therefore concluded that a path of least electrical resistance (least electrical resistivity) was provided through the dominate (continuous) phase of polybutadiene rubber of the blend of masterbatches.

It is further concluded that the significantly reduced resistivity of the blend of masterbatches as compared to the rubber Sample B of Example I verifies the presence of the combination of continuous polybutadiene rubber phase containing the rubber reinforcing carbon back reinforcement and the dispersed phase of polyisoprene rubber containing the precipitated silica.

It is seen from Table 5 that the following properties of the phase mixed masterbatch blend of this Example II (MB-1 plus MB-2) compared to the sequential blend of rubber Sample B of Example I were similar, thereby indicating little advantage in employing the masterbatch blend.

(A) Similar uncured G' values of 0.29 and 0.25 indicating similar rubber processing;

(B) Similar cured G' rubber properties of 1.5 and 1.4 (10 percent strain) and 1 and 1 (50 percent strain) indicating similar stiffness properties;

(C) The same hot rebound values of 63 and 63 indicating the same hysteresis; and (D) Similar tan delta values of 0.12 and 0.11 also indicating a similar hysteresis.

However, it is also seen that the following rubber properties were significantly improved by employing the masterbatch blend (MB-1 plus MB-2) in which the zinc oxide and fatty acid were selectively added to the first masterbatch blend of polybutadiene and carbon black reinforcing filler:

(A) Significant increase in abrasion resistance in a sense of decrease in rate of abrasion of from 632 to 472; and (B) Significant increase in durability in a sense of reduction of rate of crack growth propagation (increase in minutes per millimeter of crack growth length) of from 10 to 15 minutes for the original and of from 8 to 14 minutes for the aged rubber sample.

Therefore, it is concluded that the blend of masterbatches in which the zinc oxide and fatty acid were selectively added to the first masterbatch of polybutadiene and carbon black reinforcing filler enabled preparation of a rubber composition with improved reduction in rate of abrasion and improved resistance to cut growth propagation while substantially maintaining both of stiffness (G' physical property) and hysteresis (similar hot rebound and tan delta properties), as would also be compared to rubber Sample A of Example I, to thereby provide a beneficial predictive resistance to internal heat generation during tire service for a tire with tread of such rubber composition comprised of the masterbatch blend (MB-1 and MB-2).

Example III

Masterbatch Mixing of Rubber Compositions

Two separate masterbatches of rubber compositions were prepared in a similar manner as Example II.

A first masterbatch (MB-1A) was prepared comprised of a blend of cis 1,4-polyutadiene rubber and rubber reinforcing carbon black as the reinforcing filler similar to MB-1 of Example II.

A second masterbatch (MB-2A) was prepared comprised of a blend of cis,4-polyisoprene rubber and reinforcing filler dispersion as precipitated silica similar to MB-2 of Example II.

However, contrary to Example II, for this Example III, the zinc oxide and fatty acid were added to the second masterbatch (MB-2A) comprised of the cis 1,4-polyisoprene and silica reinforcement instead of to the first masterbatch (MB-1A) comprised of the cis 1,4-polybutadiene and carbon black reinforcement.

The following Table 6 illustrates a general formulation for the first masterbatch (MB-1A) and second masterbatch (MB-2A) and for the blend of the masterbatches (which was the same formulation as for rubber Sample B of Example I) where parts are by weight (phr) unless otherwise indicated.

Table 6 shows that the zinc oxide and fatty acid were added to the second natural rubber/silica masterbatch, MB-2A, instead of the first polybutadiene/carbon black masterbatch, MB-1A (therefore contrary to Example II).

TABLE 6

| Materials | MB-1A | MB-2A | MB-1A + MB-2A |
|---|---|---|---|
| Non-productive Mixing Step(s) | | | |
| Cis 1,4-polybutadiene rubber A | 65 | 0 | 65 |
| Natural rubber | 0 | 35 | 35 |
| Carbon black (N121) | 35 | 0 | 35 |
| Precipitated silica | 0 | 16 | 16 |
| Silica coupling agent (coupler) | 0 | 1.3 | 1.3 |
| Fatty acid | 0 | 2 | 2 |
| Zinc oxide | 0 | 2 | 2 |
| Productive Mixing Step - upon mixing the Masterbatches | | | |
| Sulfur | 0 | 0 | 1.1 |
| Sulfur cure accelerators(s) | 0 | 0 | 1.5 |

Various cured and uncured rubber properties of the blend of masterbatches, namely the blend of MB-1A and MB-2A, as well as the properties of the blend of MB-1 and MB-2 reported in Example II are reported in the following Table 7.

TABLE 7

| | Masterbatch Blends | | |
|---|---|---|---|
| Properties | MB-1A + MB-2A | MB-1 + MB-2 | |
| Processing | | | |
| Uncured storage modulus G' at 15% strain, 100° C. and 0.83 Hertz (KPa) | 0.22 | 0.25 | Lower is better |
| Rubber Properties Tire Tread Predictive Handling Properties, Cured Storage Modulus (G')[1] at 100° C., 11 Hertz (KPa)[1] | | | |
| 10% strain (KPa) | 1.33 | 1.44 | Higher is better |
| 50% strain (KPa) | 0.98 | 1 | Higher is better |
| Tire Tread Rolling Resistance (Hysteresis) Predictive Properties | | | |
| Rebound (100° C.) | 61 | 63 | Higher is better |
| Tan delta (100° C., 10% strain, 11 Hertz) | 0.13 | 0.11 | Lower is better |
| Tire Treadwear Predictive Property, Abrasion Resistance | | | |
| Grosch abrasion, High, mg/km (rate of abrasion) | 562 | 472 | Lower is better |
| Crack Growth (Pierced Groove Flex Test)[1], 4 hr 95° C. (min/mm) | | | |
| Original | 11 | 15 | Higher is better |
| Aged (7 days at 70° C. in air) | 10 | 14 | Higher is better |

It is seen from Table 7 that the following properties of the phase mixed masterbatch blend of this Example III, namely MB-1A and MB-2A, compared to the phase mixed masterbatch blend of Example II, namely MB-1 and MB-2, were similar indicating little advantage in employing an addition of zinc oxide and fatty acid to the second masterbatch (MB-2A) containing the polyisoprene and silica reinforcing filler.

(A) Similar uncured G' values of 0.22 and 0.25 indicating similar rubber processing;

(B) Similar cured G' rubber properties of 1.33 and 1.44 (10 percent strain) and 0.98 and 1 (50 percent strain) indicating similar stiffness properties;

(C) Similar hot rebound values of 61 and 63 indicating similar hysteresis; and (D) Similar delta values of 0.13 and 0.11 also indicating a similar hysteresis.

However, it is also seen that the following rubber properties were significantly improved by employing an addition of the zinc oxide and fatty acid to the polyisoprene rubber with the silica reinforcement for the second masterbatch (MB-2A):

(A) Significant decrease in rate of abrasion of from 562 to 472; and (B) Significant reduction of rate of crack growth propagation (increase in minutes per millimeter of crack growth length) of from 11 to 15 minutes for the original and of from 10 to 14 minutes for the aged rubber sample.

Therefore, it is concluded that the blend of masterbatches in which the zinc oxide and fatty acid were selectively added to the second masterbatch (MB-2A) of polyisoprene rubber and silica reinforcing filler did not provide either of a reduction in rate of abrasion or increase in resistance to cut growth propagation although stiffness (G' physical property) and hysteresis (rebound and tan delta values) were substantially maintained as would also be compared to rubber Sample A or Example I.

While certain representative embodiments and details have been shown for the purpose of illustrating the invention, it will be apparent to those skilled in this art that various changes and modifications may be made therein without departing from the spirit or scope of the invention.

What is claimed is:

1. A method for preparation of a sulfur curable rubber composition comprised of diene-based elastomers with reinforcing filler comprised of a combination of rubber reinforcing carbon black and precipitated silica comprised of:
   (A) preparation of a first masterbatch comprised of cis 1,4-polybutadiene rubber and from about 35 to about 70 phr of reinforcing filler comprised of rubber reinforcing carbon black,
   (B) preparation of a second masterbatch comprised of cis 1,4-polyisoprene natural rubber and from about 15 to about 50 phr of reinforcing filler comprised of precipitated silica, and
   (C) blending said masterbatches:
      (1) together followed by addition of sulfur curatives comprised of sulfur and sulfur vulcanization accelerator(s), or
      (2) together with sulfur curatives comprised of sulfur and sulfur vulcanization accelerator(s);
   wherein a silica coupling agent (silica coupler) is blended with:
      (a) with the second masterbatch, or
      (b) with the blend of masterbatches to couple the precipitated silica to the diene-based elastomer(s), where the silica coupling agent contains a moiety reactive with hydroxyl groups on said precipitated silica and another different moiety interactive with said diene-based elastomer(s),
   wherein the rubber composition comprised of the blended masterbatches contains about 55 to about 70 phr of said cis 1,4-polybutadiene rubber and about 45 to about 30 phr of said cis 1,4-polyisoprene natural rubber;
   wherein the rubber composition comprised of the blended masterbatches contains reinforcing filler comprised of from about 25 to about 40 phr of said rubber reinforcing carbon black and from about 5 to about 25 phr of said precipitated silica for a total of from about 40 to about 65 phr of said reinforcing filler,
   wherein said first masterbatch further contains zinc oxide and said second masterbatch is substantially exclusive of zinc oxide,
   wherein said first masterbatch further contains added fatty acid and said second masterbatch is substantially exclusive of added fatty acid.

2. The method of claim 1 wherein said second masterbatch contains at least one of microcrystalline wax and paraffinic wax and wherein said first masterbatch is substantially exclusive of microcrystalline wax and paraffinic wax.

3. The method of claim 1 where said cis 1,4-polybutadiene is a specialized cis 1,4-polybutadiene having a microstructure comprised of about 96 to about 99 percent cis 1,4-isomeric units, a number average molecular weight (Mn) in a range of from about 150,000 to about 200,000 and a heterogeneity index (Mw/Mn) in a range of from about 1.5/1 to about 2/1.

4. The method of claim 1 wherein said specialized cis 1,4-polybutadiene is prepared by neodymium catalysis of 1,3-butadiene monomer.

5. The method of claim 1 wherein said masterbatches are blended together followed by subsequently blending with sulfur curatives therewith comprised of sulfur and sulfur vulcanization accelerator(s).

6. The method of claim 1 wherein said masterbatches are blended together with sulfur curatives comprised of sulfur and sulfur vulcanization accelerator(s).

7. The method of claim 1 wherein said coupling agent is blended with said second masterbatch.

8. The method of claim 1 wherein said coupling agent is blended with said blend of masterbatches.

9. The method of claim 1 wherein a minor amount of precipitated silica is added to at least one of said first masterbatch or to the blend of first and second masterbatches.

10. The method of claim 1 wherein a minor amount of rubber reinforcing carbon black is added to at least one of said second masterbatch or to the blend of first and second masterbatches.

11. The method of claim 1 wherein a minor amount of additional diene-based rubber is added to at least one of said first masterbatch or to the blend of first and second masterbatches wherein said additional diene-based rubber is comprised of at least one of cis 1,4-polyisoprene rubber and styrene/butadiene rubber.

12. The method of claim 1 wherein a minor amount of additional diene-based rubber is added to at least one of said second masterbatch or to the blend of first and second masterbatches wherein said additional diene-based rubber is comprised of at least one of cis 1,4-polyisoprene synthetic rubber, cis 1,4-polybutadiene rubber and styrene/butadiene rubber.

13. A rubber composition prepared by the method of claim 1.

14. A rubber composition prepared by the method of claim 1 comprised of a blend of a cis 1,4-polybutadiene rubber phase containing said rubber reinforcing carbon black and a dispersed cis 1,4-polyisoprene natural rubber phase containing said precipitated silica, wherein said cis 1,4-polybutadiene rubber phase contains from about 35 to about 70 phr of rubber reinforcing carbon black to thereby provide a path of least electrical resistance through said rubber composition.

15. A rubber composition prepared by the method of claim 2.

16. A rubber composition prepared by the method of claim 3.

17. A tire containing a component comprised of a sulfur cured rubber composition of claim 13.

18. A tire containing a component comprised of a sulfur cured rubber composition of claim 14.

19. The tire of claim 17 wherein said component is a tire tread.

20. The tire of claim 19 wherein said tread is comprised of said phased rubber blend which contains a path of least electrical resistance through the tread to the tread running surface by said dominate polybutadiene rubber phase to thereby promote dissipation of internally generated electrical charge to the tire running surface.

* * * * *